United States Patent
Bao

(10) Patent No.: US 7,952,865 B2
(45) Date of Patent: May 31, 2011

(54) COMPUTER ENCLOSURE

(75) Inventor: Shan-Qin Bao, Shenzhen (CN)

(73) Assignees: Hong Fu Jin Precision Industry (Shenzhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 241 days.

(21) Appl. No.: 12/206,735

(22) Filed: Sep. 9, 2008

(65) Prior Publication Data

US 2009/0135553 A1 May 28, 2009

(30) Foreign Application Priority Data

Nov. 28, 2007 (CN) .......................... 2007 1 0202735

(51) Int. Cl.
G06F 1/16 (2006.01)
H05K 5/00 (2006.01)
H05K 7/00 (2006.01)

(52) U.S. Cl. .................................. 361/679.4; 361/679.6

(58) Field of Classification Search .............. 361/679.4, 361/679.6; 174/50, 52.1; 312/223.3; 439/144
See application file for complete search history.

(56) References Cited

U.S. PATENT DOCUMENTS

| | | | |
|---|---|---|---|
| 5,941,617 A | 8/1999 | Crane, Jr. et al. | |
| 6,125,031 A * | 9/2000 | Della Fiora et al. | 361/679.58 |
| 6,168,124 B1 * | 1/2001 | Matsuoka et al. | 248/176.1 |
| 6,366,450 B1 * | 4/2002 | Janicek | 361/679.41 |
| 6,392,873 B1 * | 5/2002 | Honda | 361/679.22 |
| 6,612,874 B1 * | 9/2003 | Stout et al. | 439/640 |
| 6,648,224 B2 * | 11/2003 | Lee | 235/451 |
| 6,658,700 B2 * | 12/2003 | Wortman et al. | 16/382 |
| 6,816,364 B2 * | 11/2004 | Helot et al. | 361/679.06 |
| 6,822,857 B2 * | 11/2004 | Jung et al. | 361/679.02 |
| 6,898,080 B2 * | 5/2005 | Yin et al. | 361/679.41 |
| 7,025,275 B2 * | 4/2006 | Huang et al. | 235/486 |
| 7,042,716 B2 * | 5/2006 | Shearman | 361/679.08 |
| 7,088,577 B2 * | 8/2006 | Lauffer et al. | 361/679.21 |
| 7,109,417 B1 * | 9/2006 | Beam | 174/560 |
| 7,143,478 B2 * | 12/2006 | Quijano | 16/445 |
| 7,322,737 B2 * | 1/2008 | Corbett et al. | 439/683 |
| 7,355,844 B2 * | 4/2008 | Lauffer et al. | 361/679.55 |
| 7,523,242 B2 * | 4/2009 | Lee et al. | 710/303 |
| 7,644,472 B2 * | 1/2010 | Chang et al. | 16/330 |
| 2004/0057204 A1 * | 3/2004 | Yin et al. | 361/686 |
| 2004/0105226 A1 * | 6/2004 | Geeng | 361/683 |
| 2005/0047074 A1 * | 3/2005 | Shearman | 361/683 |
| 2005/0101182 A1 * | 5/2005 | Nakamura et al. | 439/529 |
| 2005/0141180 A1 * | 6/2005 | Umeda et al. | 361/681 |

(Continued)

FOREIGN PATENT DOCUMENTS

CN 200944211 Y 9/2007
CN 200956129 Y 10/2007

Primary Examiner — Jayprakash N Gandhi
Assistant Examiner — Adrian S Wilson
(74) Attorney, Agent, or Firm — Frank R. Niranjan

(57) ABSTRACT

An exemplary computer enclosure for detachably coupling an external device to the computer enclosure by a cable includes a receiving cavity, a interface device, and a cable guide member. The receiving cavity is configured for receiving a portion of the cable. The interface device is movably received in the receiving cavity. The interface device defines at least one port for coupling the cable thereto. The cable guide member is located adjacent to the receiving cavity, and the cable guide member supports the cable that extends from the at least one port.

13 Claims, 6 Drawing Sheets

U.S. PATENT DOCUMENTS

| | | | |
|---|---|---|---|
| 2005/0161513 A1* | 7/2005 | Huang et al. | 235/492 |
| 2005/0208801 A1* | 9/2005 | Holden | 439/144 |
| 2005/0282417 A1* | 12/2005 | Tsao | 439/131 |
| 2006/0061958 A1* | 3/2006 | Solomon et al. | 361/686 |
| 2006/0250767 A1* | 11/2006 | Brophy et al. | 361/686 |
| 2006/0274495 A1* | 12/2006 | Nakamura et al. | 361/686 |
| 2007/0246613 A1* | 10/2007 | Kennedy | 248/56 |
| 2008/0104800 A1* | 5/2008 | Chang et al. | 16/250 |

* cited by examiner

COMPUTER ENCLOSURE

BACKGROUND

1. Field of the Invention

The present invention relates to computer enclosures, and particularly to a computer enclosure including an interface device for attaching one or more peripherals thereto.

2. Description of Related Art

A computer enclosure generally includes a cage and a first panel attached to the cage. The first panel usually includes connectors or ports, such as USB or 1394, to connect peripherals, such as media players, to the computer.

However, when a peripheral is connected to a port on the first panel by a cable, the cable is exposed or "stick-out" from the front panel and may be prone to accidental collision with walls or other objects due to the computer being repositioned or the objects being repositioned around the computer. Also, the cable may be subjected to inadvertent pulling or dragging and this may produce an unstable connection.

Therefore, providing an interface device for reliably connecting external portable devices, such as the media player, to the first panel of the computer enclosure is desired.

SUMMARY

Accordingly, a computer enclosure for coupling a peripheral to the computer enclosure by a cable is provided. The computer enclosure includes a receiving cavity, an interface device, and a cable guide member. The receiving cavity is configured for moveably receiving the interface device and fixedly receiving the cable guide member therein. The interface device defines at least one port for attaching the cable thereto. The cable guide member supports the cable that extends from the at least one port.

Other advantages and novel features will become more apparent from the following detailed description of exemplary embodiment when taken in conjunction with the accompanying drawings.

DETAILED DESCRIPTION

Figure 1:
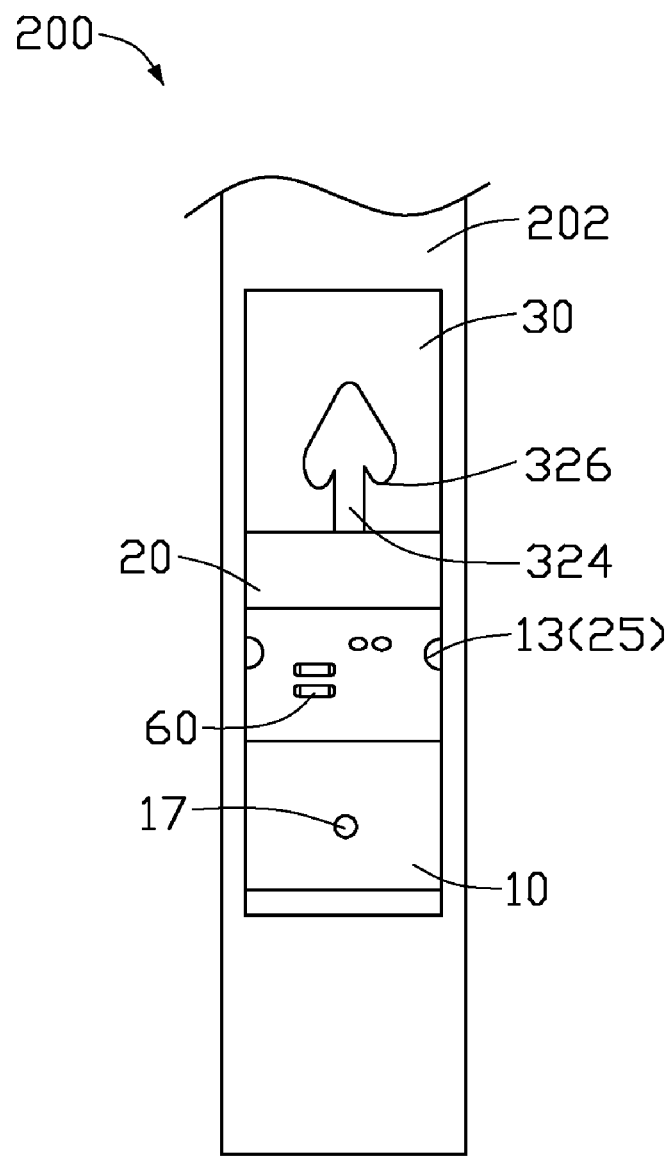
FIG. 1 is a partial front view of a computer enclosure illustrated in accordance with an exemplary embodiment, the computer enclosure including an interface device and a cable guide member.
Figure 2:
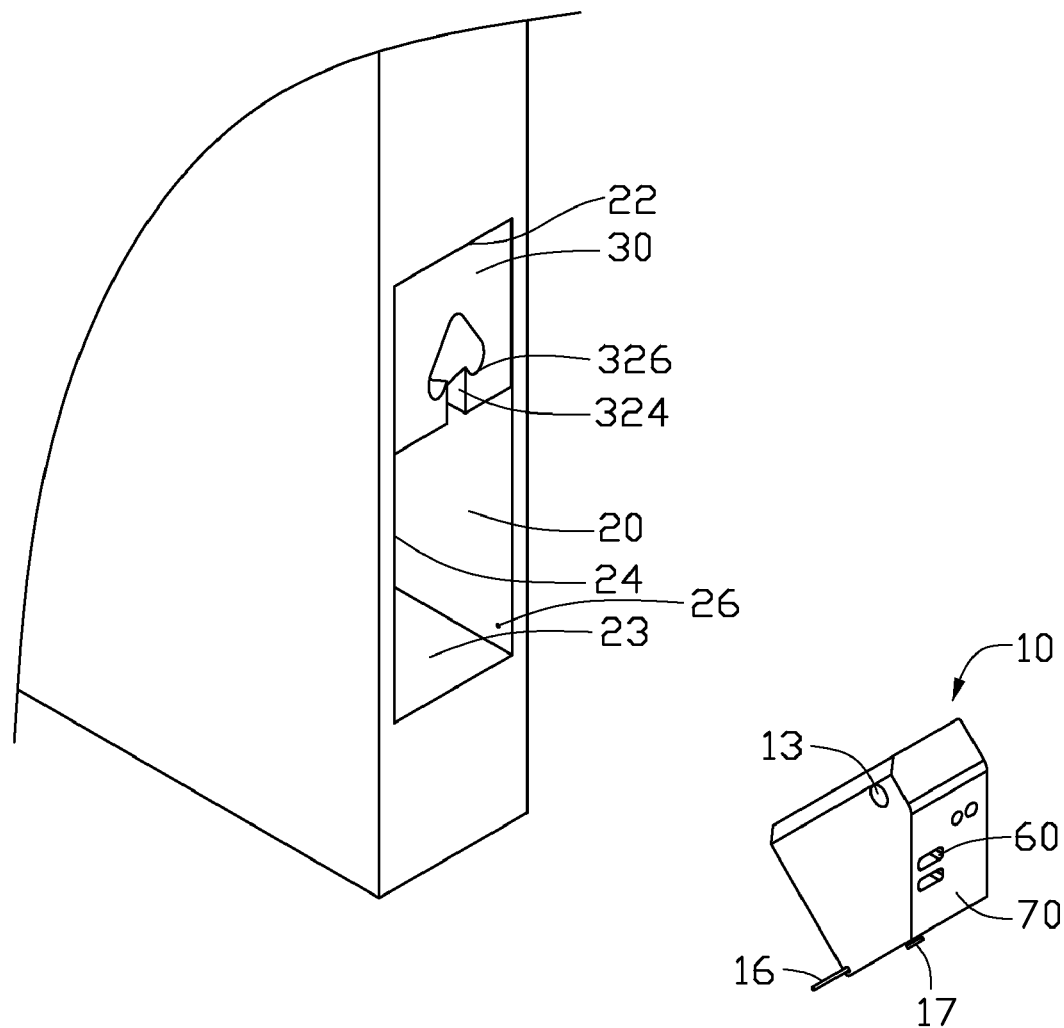
FIG. 2 is a partial exploded view of the computer enclosure of FIG. 1.

Referring to FIGS. 1 and 2, a partial front view of a computer enclosure 200 in accordance with an exemplary embodiment is illustrated. The computer enclosure 200 generally includes a first panel 202 that is located in the front of the computer enclosure 200, but may be located, for example, in the back of the computer enclosure 200. The first panel 202 may have one or more connectors for connecting one or more peripherals 40. The peripheral 40 may be an electronic media player or a mobile phone, for example. The first panel 202 defines a receiving cavity 20 for accommodating or receiving an interface device 10. The computer enclosure 200 further includes a cable guide member 30 received in the receiving cavity 20. The cable guide member 30 is located adjacent to the interface device 10. The receiving cavity 20 forms a top wall 22, a bottom wall 23, two side walls 24, and a rear wall (not shown) in the first panel 202. Each of the two side walls 24 defines a pivot hole 26 respectively.

Hereinafter, a general construction of the interface device 10 will be described in detail.

The interface device 10 is moveably accommodated or received in the receiving cavity 20. More specifically, the interface device 10 is pivotally mounted to the two side walls 24 of the first panel 202, and is rotatable with respect to the first panel 202 between a first position and a second position, such as an open position and a closed position. When the interface device 10 is in the open position, the peripheral 40 is connectable to the interface device 10 by a cable 50 (see FIG. 5). When the interface device 10 is in the closed position with the cable 50 connected, at least a portion of the cable 50 is received and/or concealed in the receiving cavity 20 (see FIG. 6).

The interface device 10 is substantially shaped like a wedge. A pair of pivot pins 16 projects, symmetrically along a same line, from corners on opposite sides of the interface device 10. The pivot pins 16 are insertable into the pivot holes 26 correspondingly defined in the receiving cavity 20. As such, the interface device 10 is rotatable around an axis defined by the pivot pins 16 and the pivot holes 26 relative to the first panel 202.

Figure 4:
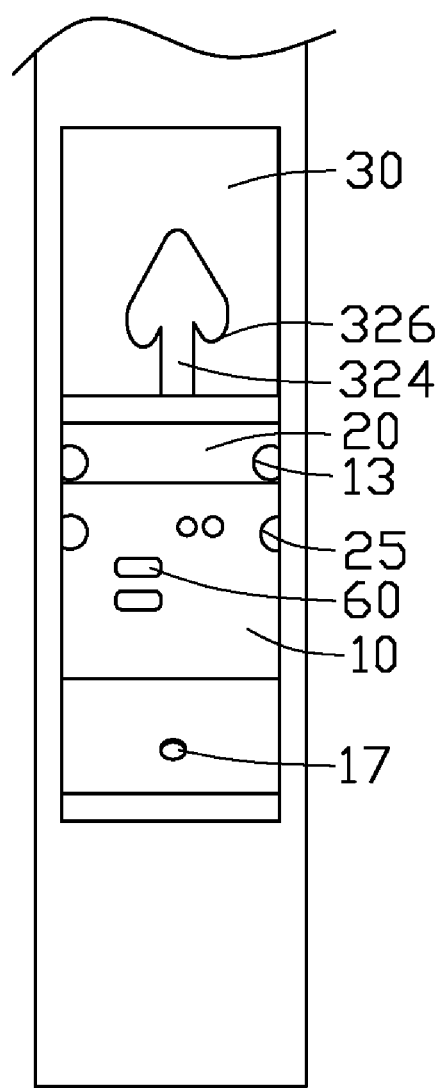
FIG. 4 is a partial front view of the computer enclosure illustrated at an open position.

A pair of locking portions 13 is also provided on the interface device 10. In the exemplary embodiment, each locking portions 13 is formed as a protruding knob. Referring also to FIG. 4, each of the two side walls 24 of the first panel 202 defines a spherical recess 25 aligned to each other for latching the protrusions of the locking portions 13, thereby, holding the interface device 10 in the closed position. Thus, the interface device 10 can be positioned relatively stable in the receiving cavity 20, even when the first panel 202 is subjected to a maximum impact forces. To unlatch the interface device 10, or change the interface device 10 from the closed position to the open position, a suitable force is required on the interface device 10 to pull the protruding protrusions of the locking portions 13 out of the spherical recesses 25.

The interface device 10 also defines an input/output (I/O) port panel 70 configured with a plurality of ports 60, such as universal serial bus (USB) ports, 1394 ports, and so on. The plurality of ports 60 are configured for detachably coupling the connectors, such as plugs or jacks, of the cable 50 to the peripheral 40 (see FIG. 5). When the interface device 10 is in the open position, the cable 50 can be conveniently and easily attached to corresponding ports 60 on the I/O port panel 70. After one or more cables 50 are attached to the corresponding ports 60, the interface device 10 can be rotated to the closed position. In the closed position, the one or more cables 50 are inside of the receiving cavity 20. Thus, the connectors are not exposed to the outside.

In addition, the interface device 10 is formed with a handle 17 so as to more easily change the positions of the interface device 10. Particularly, the handle 17 may be grasped to more easily exert a force on the interface device 10, so as to pivot the interface device 10 relative to the first panel 202 along a clockwise or anticlockwise direction.

Hereinafter, a general construction of the cable guide member 30 will be described in detail.

Figure 3:
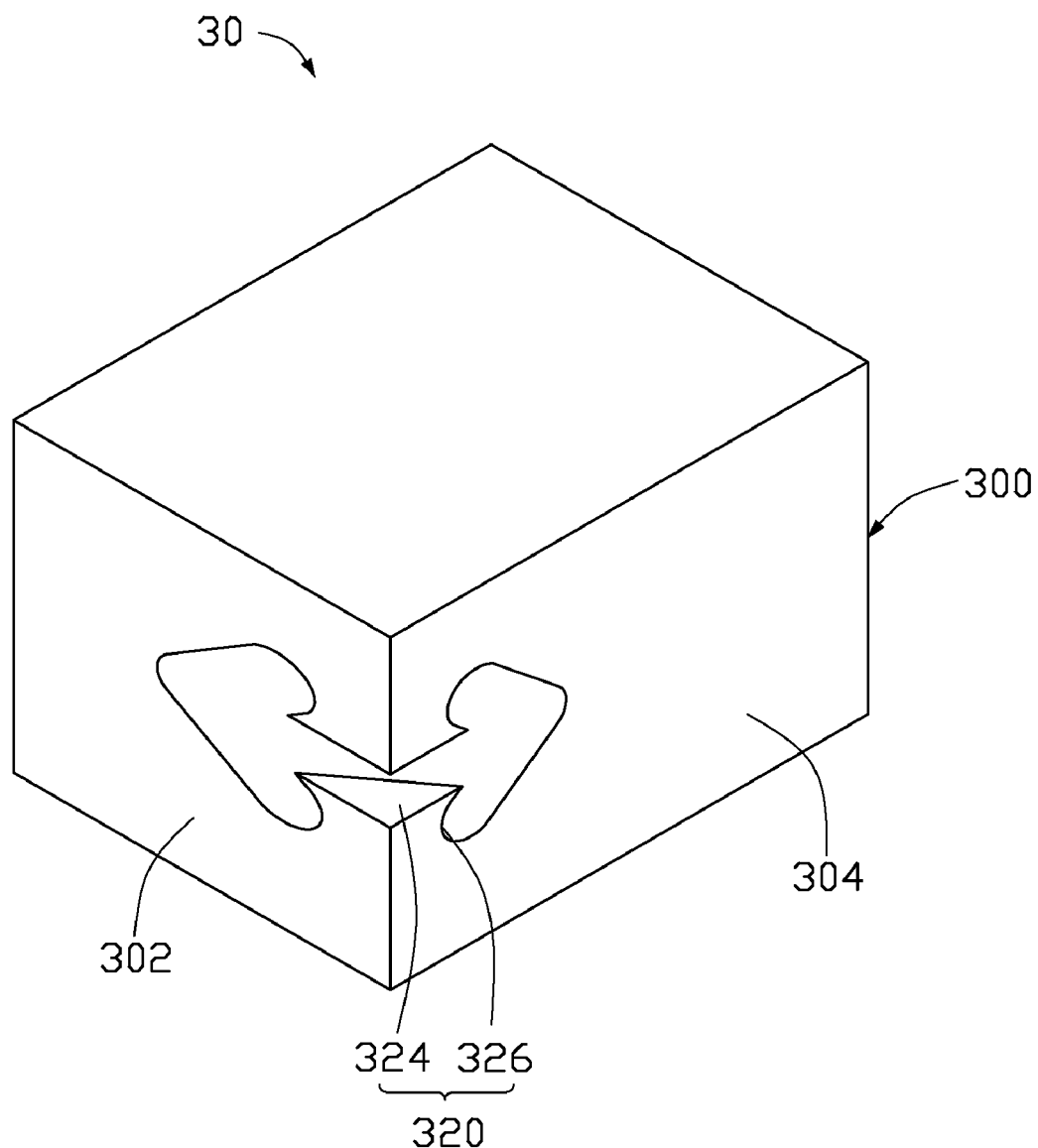
FIG. 3 is a schematic view of the cable guide member of FIG. 1.

Referring to FIG. 3, the cable guide member 30 in accordance with an exemplary embodiment is illustrated. The cable guide member 30 is shaped substantially to be a regular hexahedron. The cable guide member 30 includes a top surface 300, a bottom surface 302 opposite to the top surface 300, and a front surface 304 substantially perpendicularly connecting between the top surface 300 and the bottom surface 302. The cable guide member 30 is substantially fixed to the top wall 22 and the two side walls 24. As such, the top surface 300 of the cable guide member 30 is substantially in full contact with the top wall 22, the bottom surface 302 extends substantially perpendicularly to the first panel 202, and the front surface 304 extends substantially parallel to the first panel 202.

The cable guide member 30 defines two cable channels 320 on adjacent bottom surface 302 and front surface 304 of the cable guide member 30. Each of the cable channels 322 includes a straight stem channel 324 and an arrow-type opening 326. The two stem channels 324 communicate/connect at the edge of the bottom surface 302 and at the edge of the front surface 304. The two arrow-type openings 326 are arranged for supporting the cable 50, and allowing the cable 50 to extend therethrough.

Hereinafter, an assembling process of the computer enclosure 200 and operations of coupling peripherals 40 to the computer enclosure 200 will be described in detail.

During assembling, firstly, the interface device 10 is pivotably mounted to the first panel 202 by inserting the pivot pins 16 into the pivot holes 26. At the same time, the locking portions 13 are engageably received in the recesses 25, and the interface device 10 is stably received in the receiving cavity 20.

Secondly, the cable guide member 30 is fixedly mounted to the first panel 202, and is received in the receiving cavity 20. In alternative embodiment, the cable guide member 30 may be fixedly mounted to the first panel 202, and then the interface device 30 may be pivotably mounted to the first panel 202.

After the interface device 10 and the cable guide member 30 are mounted, and the interface device 10 is in the closed position, the plurality of ports 60 generally faces the bottom surface 302 of the cable guide member 30.

Figure 5:
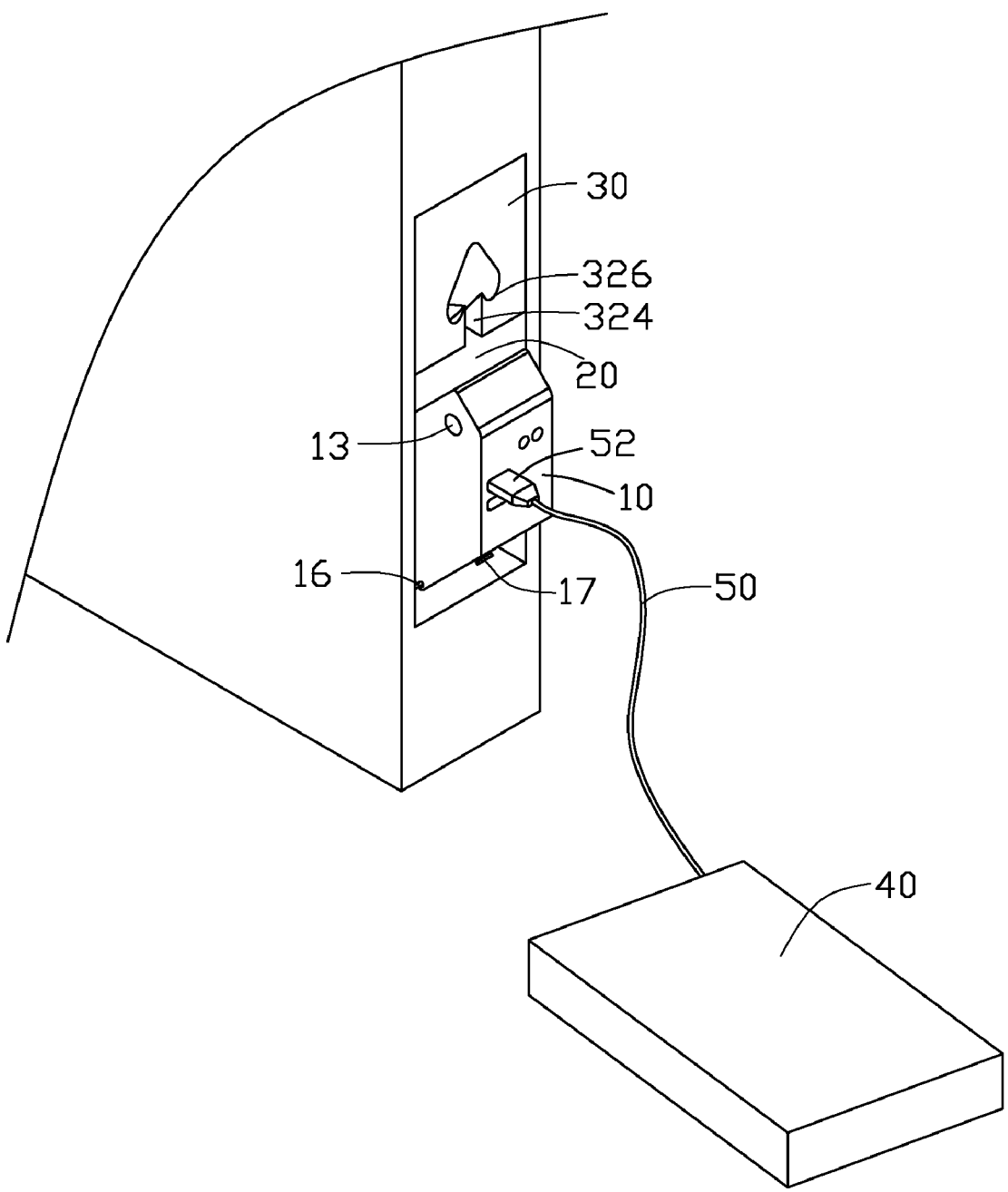
FIG. 5 is an assembled view of the computer enclosure of FIG. 1 illustrated with an external device attached thereto, the interface device located at the open position.

From the closed position, the interface device 10 is pivotally rotated around the pivot pins 16 to the open position by exerting a suitable force on the handle 17. The interface device 10 rotates outwards to the open position, and the locking portions 13 are slightly rotated away from the recesses 25. Referring to FIGS. 4 and 5, in the open position, the I/O port panel 70 is substantially parallel to the front surface 304 of the cable guide member 30. As such, the cable connector 52 can be inserted into the plurality of ports 60.

Figure 6:
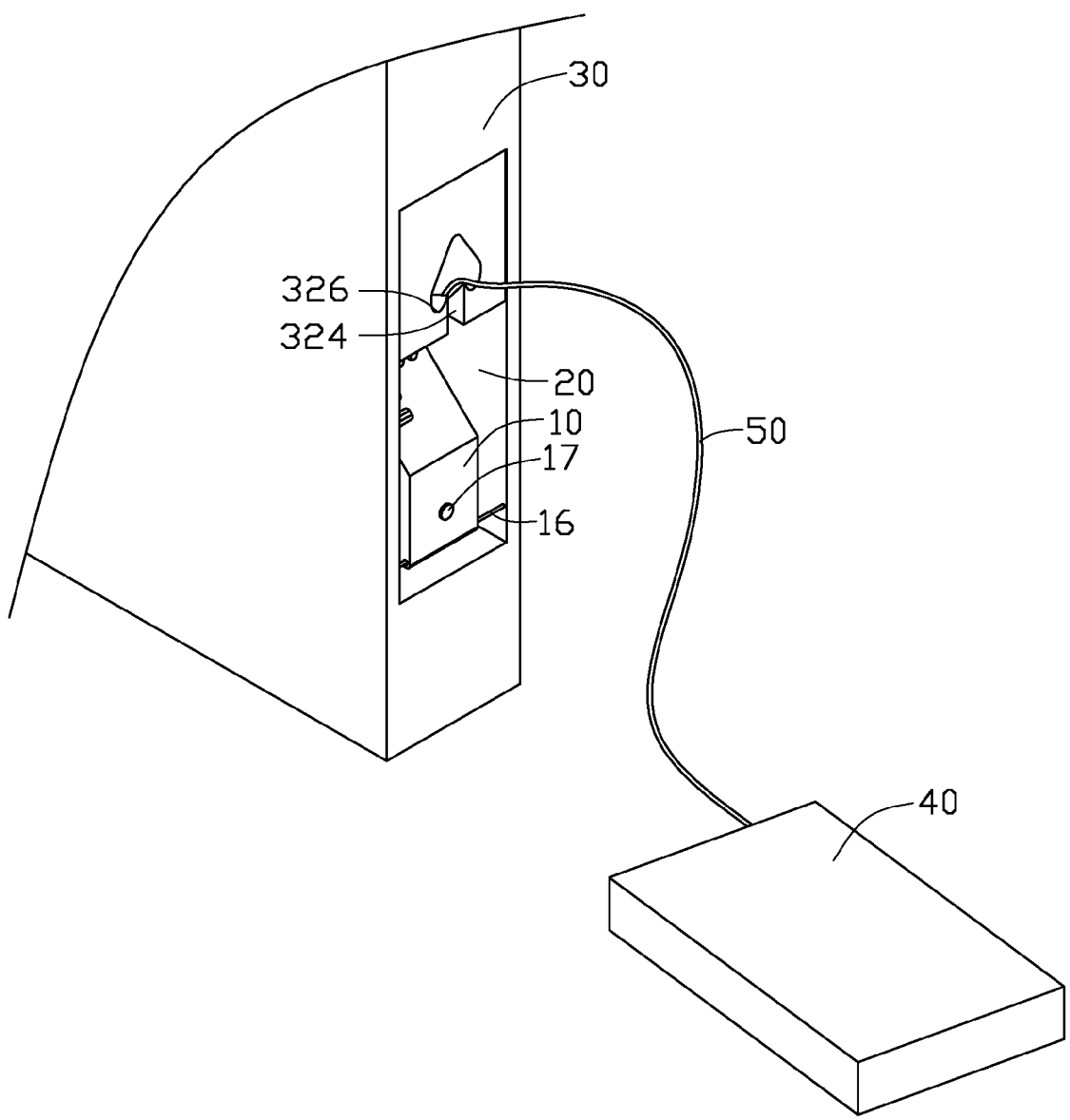
FIG. 6 is the assembled view of the computer enclosure of FIG. 1 with the interface device located at the closed position.

In order to protect the physical connection between the cable 50 and one of the plurality of ports 60, the cable 50 can be drawn/guided through the cable guide member 30 and supported/hooked on one of the arrow-type openings 326 of the cable guide member 30. Then, the interface device 10 is rotated around the pivot pins 16 from the open position back to the closed position by exerting a sufficient force to the handle 17. Referring to FIG. 6, with the locking portions 13 being engageably received in the recesses 25, the interface device 10 can be stably received in the receiving cavity 20.

In alternative embodiment, the cable 50 may be firstly coupled to the interface device 10 and pivotally rotated from the open position to the closed position. Then, the cable 50 extends through the cable guide member 30, and is supported/hooked on the arrow-type opening 324 of the cable guide member 30.

As described above, the cable 50 used for coupling the peripheral 40 to the computer enclosure 200 is supported/hooked by the cable guide member 30, which also can be deemed as a buffer member for reducing any inadvertent forces that may hinder the attachment of the cable 50. In addition, the interface device 10 can be received or concealed in the receiving cavity 20 of the first panel 202, the plurality of ports 60 is also protected from being in contact with external objects.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A computer enclosure for detachably coupling a peripheral to the computer enclosure by a cable, the computer enclosure comprising:
    a first panel defining a receiving cavity;
    an interface device movably received in the receiving cavity, the interface device defining a port for coupling the cable thereto; and
    a cable guide member fixedly received in the receiving cavity, the cable guide member supporting the cable coupled to the port and allowing the cable to extend through the cable guide member;
    wherein the interface device is pivotably mounted to the first panel, the interface device pivots relative to the first panel from a closed position to an open position, in the closed position the interface device is located under the cable guide member and the port is substantially received in the receiving cavity, and in the open position the port is exposed to be viewable from the front of the first panel.

2. The computer enclosure of claim 1, wherein the interface device projects with two pivot pins that can be respectively inserted into two pivot holes defined in the first panel.

3. The computer enclosure of claim 1, wherein the interface device is formed with at least one locking portion for locking the interface device to the first panel when the interface device is received in the receiving cavity.

4. The computer enclosure of claim 3, wherein the at least one locking portion is a protrusion having a spherical surface, the first panel defines at least one spherical recess for engageably receiving the at least one protrusion in the at least one spherical recess.

5. The computer enclosure of claim 1, wherein the interface device is formed with a handle for facilitating exerting force to push or pull the interface device, so as to pivot the interface device relative to the first panel.

6. A computer enclosure for removably attaching a peripheral thereto by a cable that is formed with a cable connector at an end thereof, the computer enclosure comprising:
    a plurality of ports defined in the computer enclosure, one of the plurality of ports being selected for inserting the cable connector of the cable thereto, a first portion of the cable extending from the one of the plurality of ports being received inside of the computer enclosure, and a second portion of the cable extending outside of computer enclosure; and
    a cable guide member mounted to the computer enclosure, the cable guide member being carved with at least one arrow-type opening for the cable coupled to the one of the plurality of ports extending through the cable guide member and the cable being supported by the cable guiding member.

7. The computer enclosure of claim 6, wherein the computer enclosure defines a receiving cavity for fixedly receiving the cable guide member therein.

8. The computer enclosure of claim 7, wherein the computer enclosure further comprises an interface device pivotably received in the receiving cavity, the plurality of ports are provided on the interface device.

9. The computer enclosure of claim 7, wherein the interface device is provided with at least one locking portion for locking the interface device to the computer enclosure.

10. A computer enclosure for detachably coupling a peripheral to the computer enclosure by a cable, the computer enclosure comprising:
  a receiving cavity;
  an interface device pivotably accommodated in the receiving cavity, the interface device being provided with a plurality of ports, and capable of being pivoted from an open position to a closed position, in the open position the plurality of ports being exposed to be viewable from outside of the computer enclosure and one of the plurality of ports can be selected for coupling the cable thereto, in the closed position the plurality of ports being substantially concealed in the receiving cavity, and the cable extending from the one of the plurality of ports; and
  a cable guide member disposed adjacent to the interface device, the cable guide member supporting the cable extending from the one of the plurality of ports.

11. The computer enclosure of claim 10, wherein the cable guide member is carved with two arrow-type openings, the two arrow-type openings extend substantially perpendicularly to each other for sequentially supporting the cable that extends from the one of the plurality of ports.

12. The computer enclosure of claim 10, wherein the interface device is formed with at least one locking portion for stably accommodating the interface device in the receiving cavity.

13. The computer enclosure of claim 12, wherein the locking portion is a protrusion having a substantially spherical surface, and the computer enclosure is formed with complementary spherical recess for engageably receiving the locking portion therein.

* * * * *